3,398,133
WATER-SOLUBLE REACTIVE DISAZO TRIAZINE
CONTAINING DYESTUFFS

Ian Knowles Barben and Cecil Vivian Stead, Manchester, England, assignors to Imperial Chemical Industries Limited, London, England, a corporation of Great Britain
No Drawing. Filed Dec. 30, 1965, Ser. No. 517,823
Claims priority, application Great Britain, Jan. 8, 1965, 992/65
7 Claims. (Cl. 260—153)

ABSTRACT OF THE DISCLOSURE

A water-soluble azo dyestuff of the formula

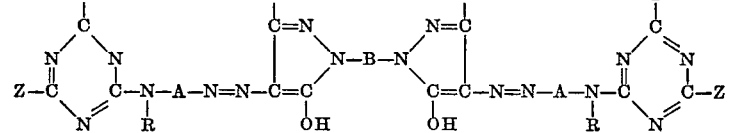

wherein B represents a divalent carbocylic aromatic radical selected from the group consisting of benzene, diphenyl and stilbene radicals in which the phenyl nuclei can be substituted by substituents selected from the group consisting of chlorine, methyl and sulphonic acid, each A represents a divalent benzene or naphthalene radical which can be substituted by $CO_2H$ or $SO_3H$,
each X represents a methyl, carboxyl or carbo-lower alkoxy group.
each R represents hydrogen or a lower alkyl group,
each Y represents chlorine or bromine, and
each Z represents a chlorine or bromine atom or an amino, lower alkoxy or mono- or di-sulphoanilino group.

---

This invention relates to new water-soluble reactive azo dyestuffs, to the methods of preparation thereof and to the use of such dyestuffs for colouring textile materials.

It is known to use dyestuffs containing halogeno-s-triazine groups for the purpose of colouring fibres containing hydroxyl groups, especially cellulose materials such as cotton and viscose rayon.

These dyestuffs readily fix on such materials with good fastness to wet processing, since the halogeno-s-triazine group is able to react with hydroxyl groups of the cellulose molecule in the presence of acid-binding agents, especially at elevated temperatures. For this purpose, the dyestuffs are applied from aqueous solutions or aqueous printing pastes and, owing to a side-reaction in which the halogeno-s-triazine group reacts with water instead of the cellulose molecule, a considerable portion of the dyestuff does not fix on the fibre.

Consequently an excess of dyestuff must be used and the dyeings or prints must be thoroughly washed with boiling soap solution to remove the unreacted dyestuff. The wastage of dyestuff and extra processing make the dyeing or printing process more expensive, especially when deep shades are required.

The present invention is concerned with the production of water-soluble halogeno-s-triazine reactive dyestuffs which have a remarkably high fixation on the fibre and for which washing-off treatments can be reduced considerably.

According to the invention there are provided reactive water-soluble azo dyestuffs of the formula:

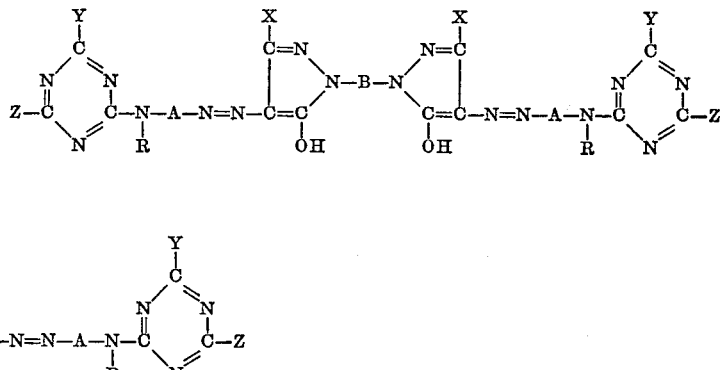

wherein B represents a divalent carbocyclic aromatic radical,
each A represents a divalent benzene or naphthalene radical which can contain substituents,
each X represents a methyl, carboxyl, or carbo-lower alkoxy group,
each R represents hydrogen or a lower alkyl group,
each Y represents chlorine or bromine, and
each Z represents a chlorine or bromine atom or an amino, substituted amino or alkoxy group and the 1:1-copper complexes of these dyes.

As examples of radicals represented by B in the above formula there can be mentioned 2,2'-disulpho-4,4'-diphenylene, 4,4'-diphenylene, 1,3 and 1,4-phenylene, 3,3'-dichloro-4,4'-diphenylene, 3,3'-dimethyl-4,4'-diphenylene, 4,4'-diphenylene-methane and 2,2'-disulpho-4,4' - diphenylene-ethylene.

As examples of radicals represented by A in the above formula, there can be mentioned sulpho-1,3-phenylene, carboxyl-1,4-phenylene, sulpho-1,4-phenylene, 1,3-phenylene,1,4-phenylene, 4,8-disulpho-2,6-naphthylene, chloro-1,4-phenylene, methoxy-1,4-phenylene and carboxy-1,3-phenylene.

As examples of substituted amino groups represented by Z there can be mentioned anilino groups more especially mono- and disulphoanilino groups, for example, 3,5-disulphoanilino-2,5-disulphoanilino-, 2-, 3- and 4-sulphoanilino- and 4,5-disulpho-2-methylanilino.

The preferred dyestuffs are those in which B represents 2,2'-disulpho-4,4'-diphenylene, X represents a $CO_2H$ group, A is sulphophenylene, especially 2-sulpho-1,4-phenylene, and Z represents a disulphoanilino group, since such dyestuffs can be built up to give prints of very deep shades, whilst still maintaining a high efficiency of reaction.

The term "lower" used in connection with alkyl or alkoxy groups refers to such groups having at most 4 carbon atoms.

The new dyestuffs can be obtained by combining together, by condensation and coupling in the usual manner, (1) a bis-pyrazolone coupling component having the nitrogen atoms in the 1-positions of the pyrazole rings linked through an aromatic radical, (2) a diazo component of the benzene or naphthalene series having, in addition to the diazotisable amino group, an amino or monosubstituted amino group or group convertible to an amino or monosubstituted amino group attached to the nucleus, and (3) either (a) an s-triazine compound having two chlorine or bromine atoms and also a third chlorine or bromine atom or an amino, substituted amino or alkoxy group, or (b) an s-triazine compound containing 3 chlorine or bromine atoms together with an amino or hydroxyl compound which will react therewith to replace one of these halogen atoms by an amino, substituted amino or alkoxy group. In addition, a metallisation step is required for the production of the metal complex dyestuffs of the invention.

The steps necessary for manufacture of the new dyestuffs can be performed in a number of ways, as will be described below with reference to the preferred methods.

(A) Two moles of a diazo component of the kind stated under (2) are diazotised and coupled with the coupling component to obtain a diazo compound containing two amino or monosubstituted amino groups, or groups convertible to amino or monosubstituted amino groups, e.g. by hydrolysis or reduction. In the latter case, the disazo compound is then subjected to a reduction or a hydrolysis step to form the amino or monosubstituted amino groups necessary to allow condensation. To form the new dyestuff the disazo compound so obtained is then condensed with an s-triazine compound of the kind mentioned under 3(a) above or is first condensed with an s-triazine compound and the resultant product with an amino or hydroxyl compound of the kinds mentioned under 3(b) above.

(B) A diazo component of the kind stated under (2) above having an amino or monosubstituted amino group is condensed with an s-triazine compound of the kind mentioned under 3(a) above or is first condensed with an s-triazine compound and the resultant product with an amino or hydroxyl compound of the kinds mentioned under 3(b) above. Two moles of the resultant compound so obtained are then diazotised and coupled with the coupling component.

(C) A diazo component of the kind stated under (2) above having an amino or monosubstituted amino group is condensed with an s-triazine compound having three chlorine or bromine atoms. Two moles of the resultant compound are then diazotised and coupled with the coupling component, and the resultant compound is condensed with two moles of an amino or hydroxyl compound of the kind mentioned under 3(b) above.

(D) The copper complex dyestuffs of the invention are preferably manufactured by a variation of the procedure described under (A) above in which the product obtained by coupling is subjected to metallisation with a copper salt before carrying out the subsequent condensation with an s-triazine compound.

Thus according to a further feature of the invention there is provided a process for manufacture of the new reactive water soluble azo dyestuffs which comprises reacting together a compound of the formula:

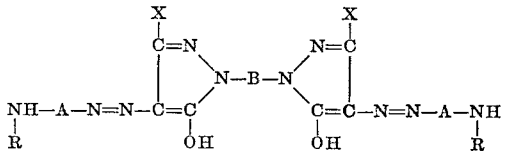

wherein A, B, R and X have the meanings stated above, or a copper complex of such a compound, and a s-triazine of the formula:

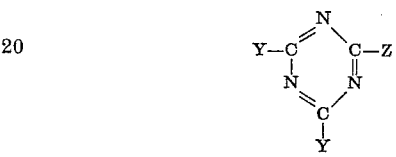

wherein Y and Z have the meanings stated above; or by reacting together a compound of the formula:

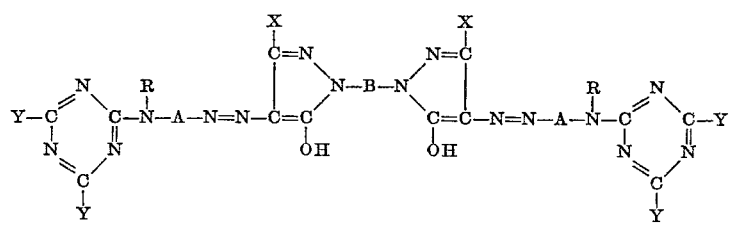

wherein A, B, R, X and Y have the meanings stated above, or a copper complex of such a compound with 2 moles of an amino or hydroxyl compound which will react therewith to replace one chlorine or bromine atom on each triazine nucleus by an amino, substituted amino or alkoxy group, or by diazotising two moles of an aromatic amine of the formula:

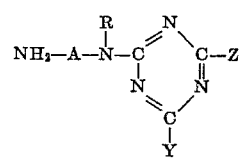

wherein A, R, Y and Z have the meanings stated above and coupling the diazonium compound with a coupling component of the formula:

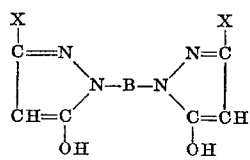

wherein B and X have the meanings stated above.

The new dyestuffs can be used for dyeing or printing a wide variety of textile materials. They are particularly valuable for use as reactive dyes for cellulose with which they are capable, in the presence of acid-binding agents, of reacting with a high degree of efficiency.

The invention is illustrated, but not limited by the following examples in which parts are by weight:

Example 1

A neutral solution of 19.2 parts of m-phenylene-diamine-o-sulphonic acid in 250 parts of water is added during 30 minutes to a stirred suspension of 18.9 parts of cyanuric chloride, in 50 parts of acetone and 200 parts of ice and water at 0–5° C. After stirring for 45 minutes at 0–5° C. the mixture is neutralised and a neutral solution of 25.3 parts of aniline-3:5-disulphonic acid in 100 parts of water is added and the temperature is raised to 30–35° C. The mixture is stirred for 4 hours, whilst maintaining the pH at 6–7 by the addition of 2 N-sodium carbonate, then filtered, cooled to below 5° C. and a solution of 7.0 parts of sodium nitrite in 20 parts of water is added, followed by 25 parts of concentrated hydrochloric acid.

After stirring at 0–5° C. for 1 hour the excess of nitrous acid is removed by the addition of aqueous sulphamic acid solution. The resultant solution is added during 30 minutes to a neutral solution of 25.3 parts of 4:4′-bis-(3″-methyl-5″-pyrazolon - 1″ - yl)diphenyl-2:2′-disulphonic acid in 400 parts of water at 0–5° C. The pH is maintained at 6–7 by the simultaneous addition of caustic liquor. After stirring for 20 hours 40 parts of salt are added and the dyestuff is filtered off, washed with brine solution and dried in air.

It colours cellulose in orange shades.

Example 2

A neutral aqueous solution of 28.8 parts of 5-acetylamino-2-aminobenzoic acid in 1000 parts of water is cooled to below 10° C. and a solution of 14 parts of sodium nitrite in 100 parts of water is added followed by 60 parts of concentrated hydrochloric acid (s.g. 1.18) and 40 parts of ice. After stirring for 30 minutes at 5–10° C. the excess of nitrous acid is removed by the addition of sulphamic acid solution and the mixture is added during 30 minutes to a neutral solution of 50.6 parts of 4:4′-bis-(3″-methyl-5″-pyrazolon - 1″ - yl)diphenyl-2:2′-disulphonic acid in 1600 parts of water. The pH is maintained at 7–8 by the simultaneous addition of caustic liquor. When coupling is complete, 100 parts of salt are added and the precipitate is filtered off. The filter-cake is stirred at 100° C. in 2000 parts of 2 N-sodium hydroxide for 2 hours. After cooling and neutralising the product is filtered off and dried. A suspension containing 24.2 parts of this product in 1500 parts of water is stirred at 60–65° C., the pH is adjusted to 6.0–6.5 by the addition of glacial acetic acid and a solution of 4.2 parts of copper sulphate hydrate in 130 parts of water is added. The mixture is stirred at 60–65° C. for 1 hour then 18 hours at room temperature. The product is filtered off and washed with water and dried.

A neutral solution of 5.1 parts of aniline-3:5-disulphonic acid in 30 parts of water is added to a suspension of 4.1 parts of cyanuric chloride in acetone (15 parts) and ice water (50 parts) during 15 minutes at 0–5° C. The mixture is stirred for 45 minutes at 0–5° C. then neutralised, filtered and added to a neutral suspension of 9.33 parts of the above copper complex in 1500 parts of water. The mixture is stirred at 35–40° C., maintaining the pH at 6–7 by the addition of 2 N-caustic soda solution. 50 parts of salt are added and the dyestuff is isolated by filtration, washed with 10% brine and dried in air to yield a dye giving orange shades.

Example 3

A neutral solution of 23 parts of 4-acetylaminoaniline-2-sulphonic acid containing 7 parts of sodium nitrite is added during 30 minutes to a stirred mixture of 30 parts of hydrochloric acid and 100 parts of ice water at 0–5° C. The mixture is stirred at this temperature for 15 minutes, the excess of nitrous acid is destroyed by the addition of aqueous sulphamic acid. The diazo suspension is then added during 10 minutes to a neutral solution of 28.3 parts of 4:4′-bis(3″-carboxy-5″-pyrazolon-1″-yl)diphenyl-2:2′-disulphonic acid in 200 parts of water, maintaining a temperature below 10° C. and pH 7.5 by the simultaneous addition of aqueous sodium carbonate solution. When coupling is complete the product is filtered off and washed with brine. This solid is then stirred in 400 parts of 2 N-sodium hydroxide under reflux for 2 hours. The cooled solution is then neutralised.

A neutral solution of 25.3 parts of aniline-3:5-disulphonic acid in water is added during 15 minutes to a suspension of 18.5 parts of cyanuric chloride in 100 parts of acetone and 300 parts of ice water at 0–5° C. maintaining a pH of 6.5 by the simultaneous addition of 2 N-sodium carbonate solution. When the pH remains constant the stirring is continued for a further 30 minutes, and the solution is then filtered. The neutralised solution obtained as described in paragraph 1 is added to this filtrate solution during 15 minutes, at 10° C., maintaining a pH of 6 to 6.5 by the addition of 2 N-sodium carbonate. The mixture is then heated to 35° C. and stirred for 2 hours, whilst maintaining pH 6.5–7. The solution is then treated with potassium chloride to precipitate the product which is then filtered off, washed with 20% potassium chloride solution and dried in air. When applied to cellulose in the presence of an acid-binding agent an orange shade is produced.

If the following coupling components are used in equivalent amounts in place of the 28.3 parts of 4:4′-bis(3″ - carboxy - 5″ - pyrazolon-1″-yl)diphenyl-2:2′-disulphonic acid used in the above example, dyestuffs of similar shades are obtained:

1:4-bis(3′-methyl-5′-pyrazolon-1′-yl)benzene
4:4′-bi(3″-methyl-5″-pyrazolon-1″-yl)-3:3′-dimethyldiphenyl
4:4′-bis(3″-methyl-5″-pyrazolon-1″-yl)-3:3′-dichlorodiphenyl
4:4′-bis(3″-methyl-5″-pyrazolon-1″-yl)stilbene-2:2′-disulphonic acid
4,4′-bis(3″-methyl-5″-pyrazolon-1″-yl)diphenyl-2,2′-disulphonic acid.

Example 4

A solution obtained as described in the first paragraph of Example 3, is added at 0–5° C., and during 15 minutes, to a suspension of 18.5 parts of cyanuric chloride in 100 parts of acetone and 150 parts of ice water, maintaining the pH at 6–7 by the addition of 2 N-sodium carbonate. The mixture is stirred for 3 hours at 0–5° C., then salt is added and the precipitate is filtered off, the press-cake is mixed with 25 parts of a 1:2-mixture of disodium hydrogen phosphate and potassium dihydrogen phosphate and dried. The product imparts an orange colour to cellulose when applied in the presence of an acid-binding agent.

Example 5

A solution obtained as described in the first paragraph of Example 3 is added to a suspension of 18.2 parts of 2:4-dichloro-6-methoxy-1:3:5-triazine in 100 parts of acetone and 150 parts of ice water during 15 minutes at pH 6–7. The mixture is then stirred at 35° C. until reaction is complete, maintaining the pH at 6–7 by the addition of 2 N-sodium carbonate. Salt is added and the precipitated dyestuff is filtered off and dried in air. When applied to cellulose in the presence of an acid-binding agent orange shades are obtained.

Example 6

A solution of dyestuff is obtained as described in Example 4, but instead of adding salt, 68 parts of ammonia solution (s.g. 0.88) are added and the mixture is stirred at 30–35° C. for 5 hours. The solution is neutralised, salt is added and the precipitated dyestuff is filtered off and dried in air. When applied to cellulose in the presence of an acid-binding agent orange shades are given.

Example 7

If, in place of the diazo suspension used in Example 3 there is used a solution obtained as described below, a similar dyestuff is obtained.

The solution used in this example is obtained as follows:

A solution of 15 parts of 3-acetylaminoaniline in 30 parts of hydrochloric acid (s.g. 1.18) and 100 parts of ice water is stirred at 0–5° C. and a solution of 7 parts of sodium nitrite in 50 parts of water is added during 15 minutes. The mixture is stirred for a further 30 minutes and the excess of nitrous acid is then destroyed by the addition of aqueous sulphamic acid solution.

Example 8

If the 23 parts of 4-acetylaminoaniline-2-sulphonic acid used in Example 3 are replaced by 36 parts of 6-acetylamino-2-naphthylamine-4:8-disulphonic acid and the 25.3 parts of aniline-3:5-disulphonic acid are replaced by 17.3 parts of metanilic acid, a product of similar shade is obtained.

We claim:

1. Reactive water-soluble azo dyestuffs of the formula

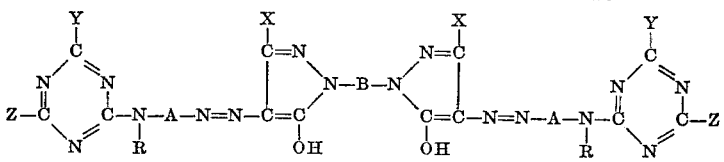

wherein B represents a divalent carbocyclic aromatic radical selected from the group consisting of benzene, diphenyl and stilbene radicals, each A represents a divalent radical selected from the group consisting of benzene and naphthalene, each X represents a member selected from the group consisting of methyl, carboxyl and carbo-lower alkoxy, each R represents a member selected from the group consisting of hydrogen and lower alkyl, each Y represents a member selected from the group consisting of chlorine and bromine, and each Z represents a member selected from the group consisting of chlorine, bromine, amino, lower alkoxy, mono- or di-sulphoanilino.

2. The reactive water-soluble azo dyestuffs of claim 1 wherein the phenyl nucleus of B is substituted with a member selected from the group consisting of chlorine, methyl and sulphonic acid.

3. The reactive water-soluble azo dyestuff of claim 1 wherein A is substituted with a member selected from the group consisting of $CO_2H$ and $SO_3H$.

4. Reactive water-soluble azo dyestuffs as claimed in claim 1 wherein B represents 2,2'-disulpho-4,4'-diphenylene, X represents a $CO_2H$ group, A represents sulphophenylene and Z represents a disulphoanilino group.

5. A water-soluble reactive dyestuff as claimed in claim 1 having the formula:

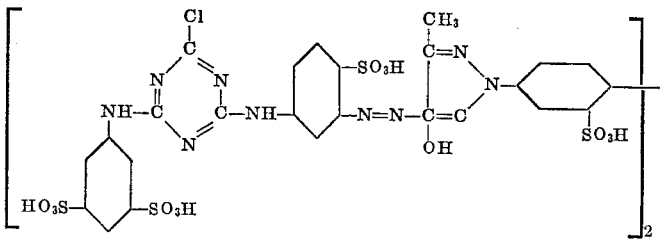

6. A water-soluble reactive dyestuff as claimed in claim 1 having the formula:

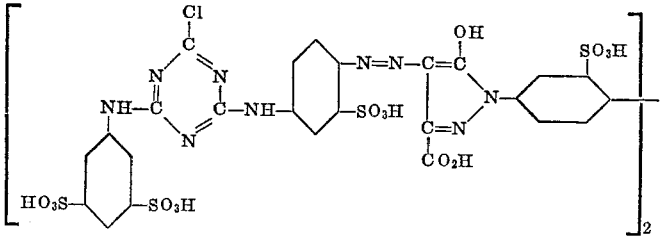

7. A water-soluble reactive dyestuff as claimed in claim 1 having the formula:

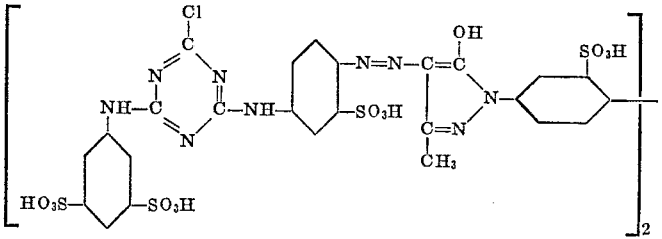

References Cited

UNITED STATES PATENTS 3,206,451   9/1965   Benz et al. _____ 260—153

CHARLES B. PARKER, *Primary Examiner.*

D. M. PAPUGA, *Assistant Examiner.*